(12) United States Patent
Kenington

(10) Patent No.: US 9,166,664 B2
(45) Date of Patent: Oct. 20, 2015

(54) ACTIVE ANTENNA SYSTEM AND METHOD FOR COMBINING SIGNALS

(75) Inventor: Peter Kenington, Chepstow (GB)

(73) Assignee: KATHREIN-WERKE KG, Rosenheim (DE)

( * ) Notice: Subject to any disclaimer, the term of this patent is extended or adjusted under 35 U.S.C. 154(b) by 683 days.

(21) Appl. No.: 12/973,276

(22) Filed: Dec. 20, 2010

(65) Prior Publication Data

US 2012/0155334 A1 Jun. 21, 2012

(51) Int. Cl.
*H04B 1/44* (2006.01)
*H04B 7/06* (2006.01)
*H04B 7/08* (2006.01)

(52) U.S. Cl.
CPC ............ *H04B 7/0613* (2013.01); *H04B 7/0837* (2013.01)

(58) Field of Classification Search
CPC ........ H04B 1/40; H04B 1/3822; H04B 1/406; H04B 1/44; H04B 1/54; H04B 1/48; H04B 1/525; H04B 1/18
USPC .................. 343/853, 858; 455/103, 129, 561, 455/562.1, 75, 76, 77, 78, 82, 83, 550.1, 455/552.1, 553.1
See application file for complete search history.

(56) References Cited

U.S. PATENT DOCUMENTS

| | | | |
|---|---|---|---|
| 5,768,691 A * | 6/1998 | Matero et al. | 455/78 |
| 5,809,395 A * | 9/1998 | Hamilton-Piercy et al. | 725/106 |
| 6,473,036 B2 * | 10/2002 | Proctor, Jr. | 342/372 |
| 2003/0092403 A1 * | 5/2003 | Shapira et al. | 455/101 |
| 2003/0109283 A1 * | 6/2003 | Shapira et al. | 455/561 |
| 2006/0052065 A1 * | 3/2006 | Argaman et al. | 455/101 |
| 2006/0291598 A1 * | 12/2006 | Gebara et al. | 375/346 |
| 2007/0126632 A1 * | 6/2007 | Goldberg | 342/378 |
| 2008/0102760 A1 * | 5/2008 | McConnell et al. | 455/73 |

* cited by examiner

*Primary Examiner* — Nhan Le
(74) *Attorney, Agent, or Firm* — Stephen H. Eland; Dann, Dorfman, Herrell & Skillman

(57) ABSTRACT

An active antenna transceiver system is disclosed. The active antenna transceiver system comprises a bandpass filter adapted to filter first telecommunication signals in a first frequency band, the first telecommunication signals being transceived in a first antenna section, an active transceiver arrangement adapted to transceive second telecommunications signal in a second frequency band, an antenna arrangement adapted to radiate and/or collect signal in both the first and second frequency bands. A combining element is provided for combining first telecommunications signal and second telecommunication signal into a combined telecommunications signal to be fed into antenna arrangement and the combining element being adapted for splitting the combined telecommunications signal from the antenna arrangement into first telecommunication signals and second telecommunications signals.

16 Claims, 2 Drawing Sheets

ACTIVE ANTENNA SYSTEM AND METHOD FOR COMBINING SIGNALS

CROSS-REFERENCE TO RELATED APPLICATIONS

The present application is related to U.S. patent application Ser. No. 12/973,160, entitled: ACTIVE ANTENNA FOR FILTERING RADIO SIGNAL IN TWO FREQUENCY BANDS, filed Dec. 20, 2010. The entire disclosure of the foregoing application is incorporated herein by reference.

FIELD OF THE INVENTION

The field of the invention relates to an active antenna transceiver system, a combined single band active and broadband passive antenna system, and to a method for combining signals from active antenna transceiver system and a broadband passive antenna.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications network wish to reduce the running costs of the base station. One option to do this is to implement a radio system as an antenna-embedded radio forming an active antenna array. Many of the components of the antenna-embedded radio may be implemented on one or more chips.

Nowadays active antenna arrays are used in the field of mobile communications systems in order to reduce power transmitted to a handset of a customer and thereby increase the efficiency of the base station, i.e. the radio station. The radio station typically comprises a plurality of antenna elements, i.e. an antenna array adapted for transceiving a payload signal. Typically the radio station comprises a plurality of transmit paths and receive paths. Each of the transmit paths and receive paths are terminated by one of the antenna elements. The plurality of the antenna elements used in the radio station typically allows steering of a beam transmitted by the antenna array. The steering of the beam includes but is not limited to at least one of: detection of direction of arrival (DOA), beam forming, down tilting and beam diversity. These techniques of beam steering are well-known in the art.

The antenna array or active antenna system is typically mounted on a mast or tower. The antenna is coupled to the base transceiver station (BTS) by means of a fibre optics cable and a power cable. The base transceiver station is coupled to a fixed line telecommunications network operated by one or more operators.

Equipment at the base of the mast as well as the active antenna system mounted on the mast is configured to transmit and receive within well defined limits set by communication standards.

The code sharing and time division strategies as well as the beam steering rely on the radio station and the antenna array to transmit and receive within well defined limits set by communication standards. The communications standards typically provide a plurality of channels or frequency bands useable for an uplink communication from the handset to the radio station as well as for a downlink communication from the radio station to the handset.

For example, the communication standard "Global System for Mobile Communications (GSM)" for mobile communications uses different frequencies in different regions. In North America, GSM operates on the primary mobile communication bands 850 MHz and 1900 MHz. In Europe, Middle East and Asia most of the providers use 900 MHz and 1800 MHz bands.

As technology evolves, the operators have expressed a desire for an active antenna product which is able to utilise the existing base-station investments, in addition to providing a new system/band. For example, in the roll-out of long term evolution (LTE) at 700 MHz (US) or 800 MHz (EU), the operators would like to deploy a single antenna at the masthead which could transmit the existing 900 MHz (EU) or 850 MHz (US) GSM signals, using equipment at the base of the mast, as well as providing active antenna functionality for the new LTE installation.

One solution could be to use a dual-band or broadband passive antenna, with two traditional base-stations at the foot of the tower. For example, the dual-band or broadband passive antenna would be mounted on a mast adjacent to a traditional base-station 'hut' or equipment cabin. This solution however would suffer various drawbacks. Having a dual band or broadband passive antenna would not allow the two bands to have independent downtilt angles. Both bands would need to share the same downtilt and this would be sub-optimal for either one or both systems, depending upon the tilt angle chosen.

It would be useful to combine existing RF signals, hereafter referred to as passive signal, emanating from (or travelling to) a base station or remote radio head at the bottom of a mast (for example) with signals from a different band, directly generated (or received) within the active electronics of an active antenna system.

SUMMARY OF THE INVENTION

An active antenna system according to the disclosure comprises a bandpass filter adapted to filter first telecommunication signals in a first frequency band, an active transceiver arrangement adapted to transceive second telecommunications signals in a second frequency band, an antenna arrangement adapted to radiate signals in both the first frequency band and the second frequency band, and a combining element adapted for combining the first telecommunications signal and the second telecommunication signal into a combined telecommunications signal to be fed into the antenna arrangement.

In an aspect of the disclosure, the antenna arrangement is adapted to receive signals in both the first frequency band and the second frequency band, and the combining element is further adapted for splitting a received combined telecommunications signal from the antenna arrangement into a receive signal of the first telecommunication signal and a receive signal of the second telecommunications signals.

In yet another aspect of the disclosure, the active transceiver arrangement is located adjacent to the antenna arrangement.

In an aspect of the disclosure, the first telecommunication signals are collected in a first antenna section coupled to the bandpass filter, the first antenna section comprising a corporate feeder network coupled between the band pass filter and a first transceiver.

The combining element may be adapted for combining the first telecommunications signal and the second telecommunication signal into a combined telecommunications signal in a substantially lossless manner.

In one aspect of the disclosure, the combining element comprises at least one of a circulator and a summing junction.

In yet another aspect of the disclosure, a connection length between the bandpass filter and the combining element is chosen such that the bandpass filter appears as an open circuit for the second telecommunications signal.

In yet another aspect of the disclosure, a first shunt resistance is connected between the combining arrangement and the band pass filter.

In a further aspect of the disclosure, the active transceiver arrangement comprising a duplexer adapted to filter the second telecommunication signal, the duplexer being coupled to the combining arrangement.

In yet another aspect of the disclosure, a coupling length between the duplexer and the combining element is chosen such that the duplexer appears as a high impedance for the first telecommunications signal.

A second shunt resistance may be connected between the combining arrangement and the duplexer.

In another aspect of the disclosure, the antenna arrangement comprises a coupler adapted to extract a feedback signal from the combined telecommunication signal, and an antenna element adapted to radiate and receive signals in both the first frequency band and the second frequency band, the coupler being located between the combining element and said antenna element.

A third shunt resistance may also be connected between the combining arrangement and the combiner.

The present disclosure also teaches a method for combining signals in an active antenna system. The method for combining signals in an active antenna system comprises: receiving at a bandpass filter a first telecommunications signal in a first frequency band; filtering the first telecommunications signal; transceiving/emitting, by an active transceiver arrangement, a second telecommunications signal in a second frequency band; combining the first telecommunications signal and the second telecommunication signal into a combined telecommunications signal; and feeding into the antenna arrangement located adjacent to the active transceiver arrangement, the combined telecommunications signal to be radiated from the antenna arrangement.

In one aspect of the disclosure, the first telecommunication signal is collected a first antenna section coupled to the bandpass filter, the first antenna section comprising a corporate feeder network coupled between the bandpass filter and a first transceiver for processing the first telecommunication signal.

In another aspect of the disclosure, the combining the first telecommunications signal and the second telecommunication signal is substantially lossless.

In yet another aspect of the disclosure, the method comprises extracting, a feedback signal from the combined telecommunication signal.

The present disclosure further teaches a method for splitting signals in an active antenna system. The method for splitting signals in an active antenna system comprises: receiving, into an antenna arrangement, a combined telecommunications signal; splitting the combined telecommunications signal from the antenna arrangement into a first telecommunication signal in a first frequency band, the first telecommunication signal to be fed to a first antenna section and into a second telecommunications signals in a second frequency band to be fed into an active transceiver arrangement; filtering the first telecommunications signal; inputting, the first telecommunication signals into a first antenna section; transceiving/processing, by the active transceiver arrangement located adjacent to antenna arrangement, the second telecommunications signal.

In one aspect of the disclosure, the first telecommunication signal is collected in the first antenna section coupled to the bandpass filter, the first antenna section comprising a corporate feeder network coupled between the bandpass filter and a first transceiver for processing the first telecommunication signal.

In another aspect of the disclosure, the combining of the first telecommunications signal and the second telecommunication signal is substantially lossless.

The present disclosure teaches a computer program product comprising a non-transitory computer-usable medium having control logic stored therein for causing a computer to manufacture an active antenna transceiver system comprising: a bandpass filter adapted to filter first telecommunication signals in a first frequency band, an active transceiver arrangement adapted to transceive second telecommunications signals in a second frequency band, an antenna arrangement adapted to radiate signals in both the first frequency band and the second frequency band, and a combining element adapted for combining the first telecommunications signal and the second telecommunication signal into a combined telecommunications signal to be fed into the antenna arrangement.

The present disclosure also teaches a computer program product comprising a non-transitory computer-usable medium having control logic stored therein for causing a transceiver to execute a method for combining signals in an active antenna transceiver system, comprising: first computer readable code means receiving at a bandpass filter a first telecommunications signal in a first frequency band; second computer readable code means filtering the first telecommunications signal; third computer readable code means for transceiving/emitting, in active transceiver arrangement, second telecommunications signal in a second frequency band; fourth computer readable code means for combining the first telecommunications signal and the second telecommunication signal into a combined telecommunications signal; fifth computer readable code means for feeding, into an antenna arrangement located adjacent to the active transceiver arrangement, the combined telecommunications signal to be radiated from the antenna arrangement.

The present disclosure also teaches a computer program product comprising a non-transitory computer-usable medium having control logic stored therein for causing a transceiver to execute a method for combining signals in an active antenna transceiver system, comprising: first computer readable code means for receiving, into an antenna arrangement, a combined telecommunications signal; second computer readable code means for splitting the combined telecommunications signal from the antenna arrangement into a first telecommunication signal in a first frequency band, the first telecommunication signal to be fed to a first antenna section and into a second telecommunications signals in a second frequency band to be fed into an active transceiver arrangement; third computer readable code means for filtering the first telecommunications signal; fourth computer readable code means for inputting, the first telecommunication signals into a first antenna section; and fifth computer readable code means for transceiving/processing, by the active transceiver arrangement located adjacent to antenna arrangement, the second telecommunications signal.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The term "base transceiver station (BTS)" in the context of this disclosure includes, but is not limited to, base stations, as known from GSM networks, as well as a node B (known from UMTS/3G networks) or enhanced node B, and similar units used in other mobile communication networks.

The term "subscriber device" in the context of this disclosure is intended to encompass all types of mobile stations and other devices connected to the mobile communication network. Such subscriber devices can be portable or stationary. For example wireless modules can be incorporated into vending machines for the transceiving of data over the mobile communication network. Such wireless modules are also considered to be subscriber devices.

Figure 1:
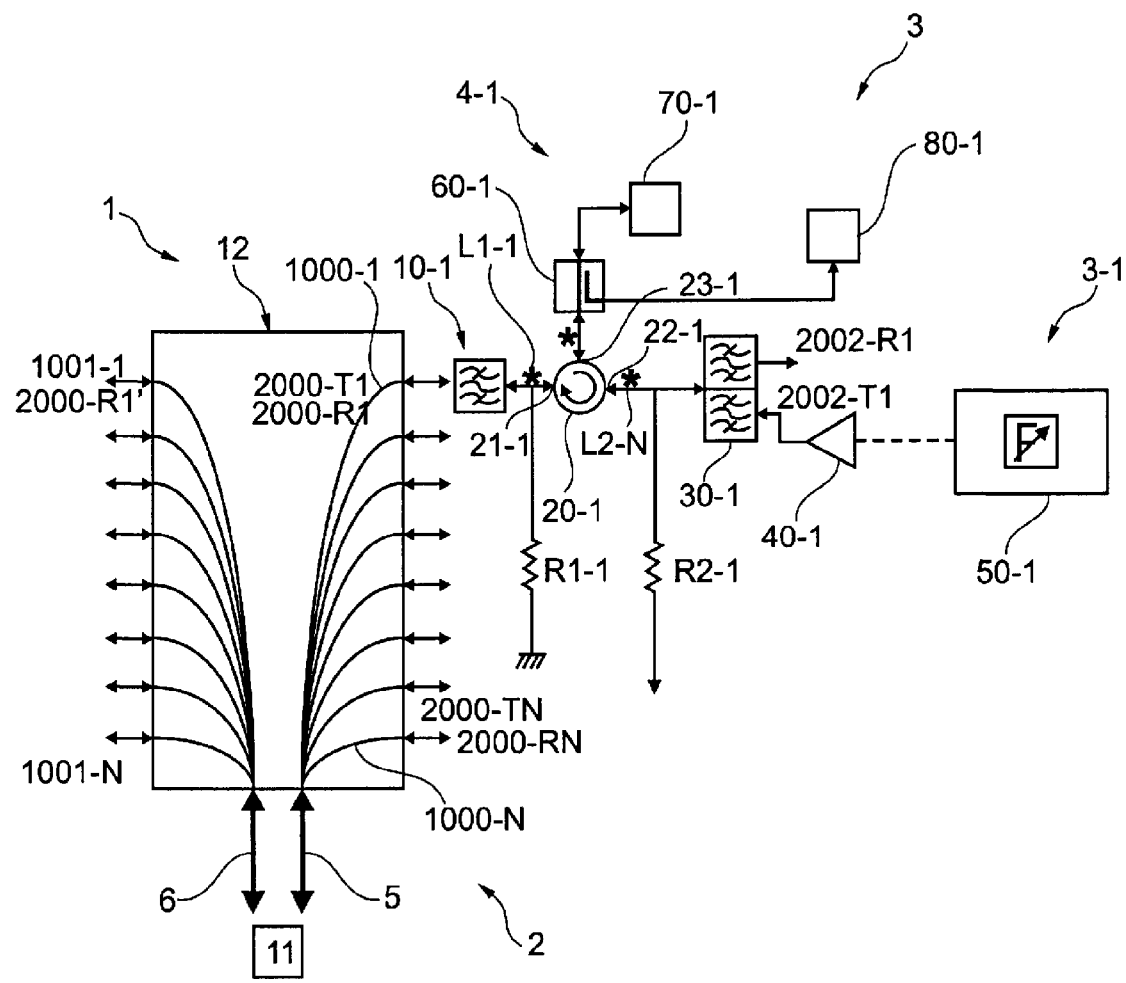
FIG. 1 shows a combined single band active and broadband passive antenna system, comprising an active antenna transceiver system according to one aspect of the disclosure.

FIG. 1 shows a combined single band active and broadband passive antenna system 1 according to one aspect of the disclosure.

The single band active and broadband passive antenna system 1 comprises two antenna sections: a first antenna section 2, hereafter referred to as the passive antenna section 2, and a second antenna section 3 hereafter referred to as the active antenna section 3.

The passive antenna section 2 is adapted to transmit and receive telecommunications signals to and from a base transceiver station 11. The passive antenna section 2 typically corresponds to existing installations, comprising the base transceiver station 11, one or more coaxial feeder cables, 5 & 6 and a corporate feed network 12.

The passive antenna section 2 may be designed to transmit telecommunications signals on a first transmit band TB1 and to receive telecommunications signal on a first receive band RB1, as defined by telecommunication standards. The passive antenna section 2 as exemplified in the present disclosure is designed to transceive GSM signals in the band of 900 MHz in Europe. The first transmit band TB1 comprises frequencies preferably between 925 MHz and 960 MHz. The first receive band RB1 comprises frequencies preferably between 880 MHz and 915 MHz. However these frequencies are not limiting of the invention and any other telecommunication bands could be contemplated.

The active antenna section 3 comprises an active transceiver arrangement 3-1, . . . , 3-N, and an antenna element arrangement 4-1, . . . , 4-N. The active antenna section 3 provides active antenna capabilities via the antenna element arrangement 4-1, . . . , 4-N. The active antenna section 3 is also adapted for transceiving signals generated (or received) within the active electronics of the active transceiver arrangement 3-1, . . . , 3-N of the active antenna section 3.

The active transceiver arrangement 3-1, . . . , 3-N is adapted to generate signals on a second, different transmit band TB2 and to receive signals on a second, different receive band RB2. For example, the active transceiver arrangement 3-1, . . . , 3-N may be designed to transceive LTE signals in the band of 800 MHz in Europe. The second transmit band TB2 comprises frequencies preferably between 790 MHz and 821 MHz. The second receive band RB2 comprises frequencies preferably between 832 MHz and 862 MHz. However this is not limiting the invention and any other telecommunication bands could be contemplated.

The antenna element arrangement 4-1, . . . , 4-N is adapted to radiate signals in the first transmit band TB1 fed from the passive antenna section 2 and signals in the second transmit band TB2 fed from the active transceiver arrangement 3-1, . . . , 3-N. The antenna element arrangement 4-1, . . . , 4-N is further adapted to collect signals in the first receive band RB1 to be fed to the passive antenna section 2 and signals in the second receive band RB2 to be fed to the active transceiver arrangement 3-1, . . . , 3-N.

The present disclosure is described with single transmit and receive bands. However, this is not limiting of the invention, and the passive antenna section 2 and/or the active transceiver arrangement 3-1, . . . , 3-N may be multiband systems, adapted to transceive signals covering more than one telecommunication band according to the telecommunications standards.

The passive antenna section 2 is connected to the base transceiver station 11 by means of a coaxial feeder cable 5 and a coaxial feeder cable 6. The coaxial feeder cable 5 is adapted to carry telecommunication signals at radio frequencies to and from the base transceiver station 11. The coaxial feeder cable 6 is adapted to carry telecommunication signals at radio frequencies to the base transceiver station 11 only.

The passive antenna section 2 comprises transmit-receive paths 1000-1, . . . , 1000-N, and receive only paths 1001-1, . . . , 1001-N. There are eight different transmit-receive paths 1000-1, . . . , 1000-N, and eight different receive only paths 1001-1, . . . , 1001-N displayed within FIG. 1. It will however be appreciated by the person skilled in the art that the number of the transmit-receive paths 1000-1, . . . , 1000-N, and the number of the receive only paths 1001-1, . . . , 1001-N, can be changed and is not limiting of the invention.

The transmit-receive paths 1000-1, . . . , 1000-N are adapted to carry transmit signals 2000-T1, . . . , 2000-TN and receive signals 2000-R1, . . . , 2000-RN between the antenna element arrangement 30 and the base transceiver station 11. The receive only paths 1001-1, . . . , 1001-N are adapted to carry receive signals 2000-R1', . . . , 2000-RN', from the antenna element arrangement 30 to the base transceiver station. The aim of the receive only paths 1001-1, . . . , 1001-N is to implement a diversity reception method, as is well-known in the art. The diversity reception method will not be described in detail in the present disclosure.

Although the passive antenna section 2 is described with the transmit-receive path 1000-1, . . . , 1000-N and the receive only path 1001-1, . . . , 1001-N for implementing a diversity reception method, this is not limiting of the invention. Any other implementation could be contemplated and the passive antenna section 10 could have transmit-receive paths 1000-1, . . . , 1000-N only.

The transmit-receive path 1000-1, . . . , 1000-N is designed to carry a first transmit signal 2000-T1, . . . , 2000-TN and a first receive signal 2000-R1, . . . , 2000-RN. The first transmit signal 2000-T1, ..., 2000-TN comprises signals of frequencies in the first transmit frequency band TB1. The first receive signal 2000-R1, ..., 2000-RN comprises signals of frequencies in the first receive frequency band RB1.

Each one of the transmit-receive paths 1000-1, 1000-N is terminated by an output to the active antenna section 3. As seen in FIG. 1, each one of the transmit-receive paths 1000-1, 1000-N is coupled to a bandpass filter 10-1, ..., 10-N. The bandpass filter 10-1, ..., 10-N allows passage of the signal at frequencies in both the receive and transmit frequency bands TB1, RB1 of the passive antenna section 2. The bandpass filter 10-1, ..., 10-N is a broadband filter covering the whole frequency band, including both transmission frequencies and reception frequencies.

The bandpass filter 10-1, ..., 10-N is coupled to a first port 21-1, ..., 21-N of a combining element 20-1, ..., 20-N. The combining element 20-1, ..., 20-N is adapted to combine signals in both of the two transmit frequency bands TB1, TB2. The combining element 20-1, ..., 20-N is adapted to split signals in both of the receive frequency bands RB1, RB2.

The combining element 20-1, ..., 20-N of FIG. 1 comprises a circulator 20-1, ..., 20-N. As will be described with reference to FIG. 2, the combining element 20-1, ..., 20-N could be a summing junction. The combining element 20-1, ..., 20-N could be a hybrid, a resistive or other form of matched combiner. However, such a combiner is not optimal in terms of power loss.

The port 21-1, ..., 21-N is adapted for feeding first transmit signals 2000-T1, ..., 2000-TN, to be fed to the antenna element arrangement 4-1, ..., 4-N, into the circulator 20-1, ..., 20-N. Similarly the port 21-1, ..., 21-N is adapted for feeding first receive signals 2000-R1, ..., 2000-RN from the antenna element arrangement 4-1, ..., 4-N into the passive antenna section 2.

A first resistance R1-1, ..., R1-N is placed between the band pass filter 10-1, ..., 10-N and the circulator 20-1, ..., 20-N and operates as a shunt resistance to the common or ground connection of the unit. The first resistance R1-1, ..., R1-N is preferably of high impedance, to ensure that the arbitrary reflection coefficient of the bandpass filter 10-1, ..., 10-N is converted to a simple, known value.

The circulator 20-1, ..., 20-N comprises a second port 22-1, ..., 22—coupled to the active transceiver arrangement 3-1, ..., 3-N. The circulator 20-1, ..., 20-N comprises a third port 23-1, ..., 23-N coupled to the antenna element arrangement 4-1, ..., 4-N.

The active transceiver arrangement 3-1, ..., 3-N is adapted to add a new band signal to the already existing telecommunication bands TB1, RB1 already installed on the passive antenna section 2. The active transceiver arrangement 3-1, ..., 3-N is therefore adapted to process second transmit signal 2002-T1, ..., 2002-TN and second receive signal 2002-R1, ..., 2002-RN.

The second transmit signal 2002-T1, ..., 2002-TN comprises signals of frequencies in the second transmit frequency band TB2. The second receive signal 2002-R1, ..., 2002-RN comprises signals of frequencies in the second receive frequency band RB2.

The active transceiver arrangement 3-1, ..., 3-N is shown as a single band antenna arrangement. However this is not limiting of the invention and the active transceiver arrangement 3-1, ..., 3-N could as well be a multiband antenna arrangement.

The active transceiver arrangement 3-1, ..., 3-N comprises a processing arrangement 50-1, ..., 50-N, a power amplifier 40-1, ..., 40-N, and a duplexer 30-1, ..., 30-N–1, ..., 30-N. The processing arrangement 50-1, ..., 50-N is adapted to process the second transmit signal 2002-T1, ..., 2002-TN, to be transmitted to the antenna element 4-1, ..., 4-N. The processing arrangement 50-1, ..., 50-N may comprise a digital signal processor, for example undergoing filtering, upconversion, crest factor reduction and beamforming processing. The processing arrangement 50-1, ..., 50-N may also comprise a digital-to-analogue conversion and upconversion block adapted to frequency-convert the transmit signal into the desired part of the RF spectrum.

The power amplifier is adapted to amplify the second transmit signals 2002-T. The duplexer 30-1, ..., 30-N–1, ..., 30-N is adapted to appropriately separate the second transmit signal 2002-T1, ..., 2002-TN and the second receive signal 2002-R for their specific bands TB2, RB2.

The duplexer 30-1, ..., 30-N comprises a receive bandpass filter 31-1, ..., 31-N with second receive signal 2002-R1, ..., 2002-RN leaving the duplexer 30-1, ..., 30-N at port 31-1, ..., 31-N. The duplexer 30-1, ..., 30-N also comprises a transmit bandpass filter 32-1, ..., 32-N, with second transmit signal 2002-T entering the duplexer at port 32-2.

The duplexer 30-1, ..., 30-N is coupled to the second port 22-1, ..., 22-N of the circulator 20-1, ..., 20-N. The second port 22-1, ..., 22-N is adapted for inputting second transmit signals 2002-T1, ..., 2002-TN to be fed to the antenna arrangement 4-1, ..., 4-N into the circulator 20-1, ..., 20-N. Similarly, port 22-1, ..., 22-N is also adapted for feeding second receive signals 2002-R1, ..., 2002-RN coming from the antenna arrangement 4-1, ..., 4-N into the active transceiver arrangement 3-1, ..., 3-N.

A second resistance R2-1, ..., R2-N is placed between the duplexer 30-1, ..., 30-N and the circulator 20-1, ..., 20-N and operates as a shunt resistance to the common or ground connection of the unit. The resistance R2-1, ..., R2-N is preferably of high impedance, to ensure that the arbitrary reflection coefficient of the duplexer 30-1, ..., 30-N is converted to a simple, known value.

The antenna arrangement 4-1, ..., 4-N comprises an antenna element 70-1, ..., 70-N and a coupler 60-1, ..., 60-N The antenna element 70-1, ..., 70-N is adapted to radiate the first transmit signal 2000-T1, ..., 200-TN and the second transmit signal 2002-T1, ..., 2002-TN, and to receive the first receive signal 2000-R1, ..., 2000-RN and the second receive signal 2002-R1, ..., 2002-RN. The antenna element 70-1, ..., 70-N is well-known and will not be described in detail in the present disclosure.

The coupler is located between the circulator 20-1, ..., 20-N and the antenna element 70-1, ..., 70-N. The coupler 60-1, ..., 60-N is adapted to extract part of the first transmit signals 2000-T1, 2000-TN and the second transmit signals, 2002-T1, 2002-TN to fed as a feedback signal to a predistortion unit 80-1, ..., 80-N. The predistortion unit 80-1, ..., 80-N provides predistortion compensation to the second transmit signals, 2002-T1, 2002-TN, as is well known in the art. It should be noted that the coupler 60-1, ... 60-N is located downstream of the circulator 20-1, ..., 20-N for the transmit signals in order to take into account the effect of the circulator 20-1, ..., 20-N in the predistortion compensation. It should also be noted that the first transmit signals 2000-T1, 2000-TN are filtered out using a suitable filter (not shown) downstream of the coupler 60-1, ..., 60-N; it is not possible for the predistorter to predistort these signals as they are generated in the BTS cabinet or an external remote radio head and not within the active electronics of the active antenna system.

Figure 2:
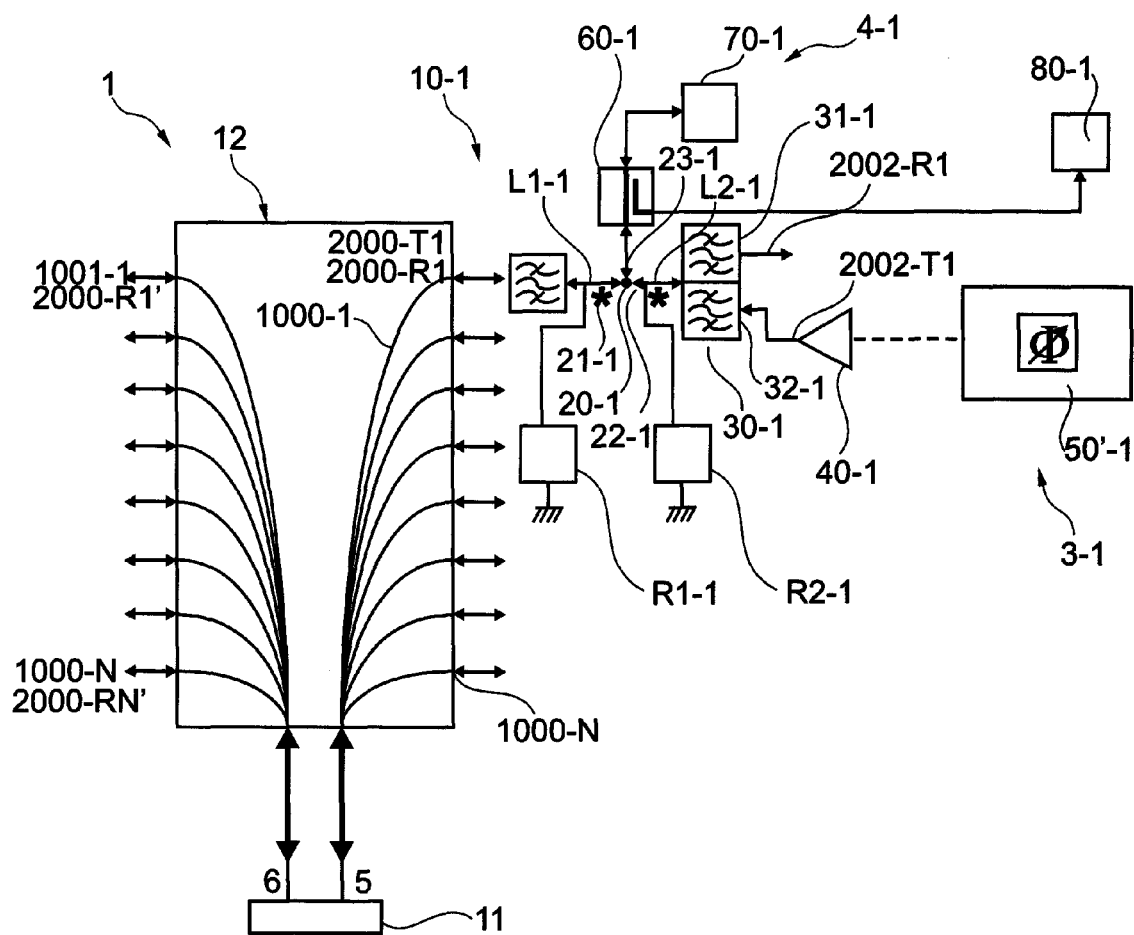
FIG. 2 shows a combined single band active and broadband passive antenna system comprising an active antenna transceiver system according to yet another aspect of the disclosure

FIG. 2 shows a combined single band active and broadband passive antenna system 1' according to another aspect of the disclosure. The combined single band active and broadband passive antenna system 1' of FIG. 2 differs from the combined single band active and broadband passive antenna system 1 of FIG. 1 in that the combing element 20' is a summing junction 200-1, ..., 200-N instead of a circulator 20-1, ..., 20-N.

A summing junction 200-1, ..., 200-N saves costs, size and weight over a circulator. The summing junction 200-1, ..., 200-N advantageously reduces the losses of the circulator 20-1, ..., 20-N, which could reduce the radiated power levels as well as increasing the noise figure. The summing junction 200-1, ..., 200-N further eliminates intermodulation issues associated with the non linearities of the circulator 20-1, ..., 20-N.

The advantages of the present invention, as disclosed in FIGS. 1 and 2, will be better understood when examining the propagation of the telecommunication signals in the system. The propagation of the signals is described with reference to FIG. 1.

The first transmit signal 2000-T1, ..., 2000-TN is fed through the coaxial cable from the external base transceiver station or RRH into the transmit path 1000-1. The first transmit signal 2000-T1, ..., 2000-TN is of a frequency of the first transmit frequency band TB1. The first transmit signal 2000-T1, ..., 2000-TN is distributed by the corporate feed network and a portion of it is passed into the bandpass filter 10-1, ..., 10-N. As mentioned above, the bandpass filter 10-1, ..., 10-N is adapted to pass through signals in both the receive and transmit frequency bands TB1, RB1 of the passive antenna section 2.

The first transmit signal 2000-T1, ..., 2000-TN leaving the bandpass filter 10-1, ..., 10-N is passed to the first port 21-1, ..., 21-N of the circulator 20-1, ..., 20-N.

The first transmit signal 2000-T1, ..., 2000-TN exits at a third port 23-1, ..., 23-N leading to the antenna element 70-1, ..., 70-N where the first transmit signal 2000-T1, 2000-TN is to be radiated.

The man skilled in the art will be understood that the first transmit signal 2000-T1, 2000-TN can not exit at the second port 22-1, ..., 22-N of the circulator 20-1, ..., 20-N. Port 22-1, ..., 22-N leads to the duplexer 30-1, ..., 30-N, which is adapted to let signal pass having the second transmit frequency band TB2 and the second receive frequency band RB2. In other words, the duplexer 30-1, ..., 30-N acts as a stop band for the first transmit signal 2000-T1, ..., 2000-TN.

It should be noted that a connection length L2-1, ..., L2-N between the circulator 20-1, ..., 20-N and the duplexer 30-1, ..., 30-N on the active transceiver arrangement side should be kept very short, to avoid parasitic reflections. The short connection length L2-1, ..., L2-N allows the first transmit signal 2000-T1, ..., 2000-TN to simply see the duplexer 30-1, ..., 30-N as an open circuit. This prevents the first transmit signal 2000-T from travelling from the combining element 20-1, ..., 20-N to the duplexer 30-1, ..., 30-N, being reflected on the duplexer 30-1, ..., 30-N and travelling back to the combining element 20-1, ..., 20-N. In other words, the connection length L2-1, ..., L2-N is kept short to ensure that it displays few, if any, of the properties of a transmission line.

Considering now the second transmit signal 2002-T1, ..., 2002-TN emanating from the active transceiver arrangement 3-1, ..., 3-N. The second transmit signal 2002-T1, ..., 2002-TN is fed onto the duplexer 32-1, ..., 32-N and on to port 22-1, ..., 22-N of the circulator 20-1, ..., 20-N. The second transmit signal 2002-T1, ..., 2002-TN will exit at port 23-1, ..., 23-N leading to the antenna arrangement 4-1, ..., 4-N where the second transmit signal 2002-T1, ..., 2002-TN is to be radiated.

It is noted that the second transmit signal 2002-T1, ..., 2002-TN will not exit at the first port 21-1, ..., 21-N, where the second transmit signal 2002-T1, ..., 2002-TN will encounter a high reflection coefficient, in the form of the bandpass filter 10-1, ..., 10-N.

It should be understood that the connection length L1-1, ..., L1-N between the circulator 20-1, ..., 20-N and the bandpass filter 10-1, ..., 10-N on the passive antenna section side should be kept very short, to avoid parasitic reflections. A very short connection length L1-1, ..., L1-N allows the second transmit signal 2002-T1, ..., 2002-TN to see the stop-band of the bandpass filter 10-1, ..., 10-N as an open circuit. This prevents the second transmit signal 2002-T1, ..., 2002-TN from travelling from the circulator 20-1, ..., 20-N to the bandpass filter 10-1, ..., 10-N, being reflected at the bandpass filter 10 and travelling back to the circulator 20-1, ..., 20-N. In other words, the connection length L1-1, ..., L1-N is kept short to ensure that it also displays few, if any, of the properties of a transmission line.

A very short signal length could be typically in the order of less than a tenth of the wavelength of the signals in any of: the transmit band TB1, the receive band RB1, the transmit band TB2 or the receive band RB2, but this is not limiting of the invention.

Considering now the first receive signal 2000-R1, ..., 2000-RN collected by the antenna arrangement 4-1, ..., 4-N. The first receive signal 2000-R1, ..., 2000-RN is fed from the antenna arrangement 4-1, ..., 4-N to the third port 23-1, ..., 23-N of the circulator 20-1, ..., 20-N. The first receive signal 2000-R1, ..., 2000-RN encounters a high-impedance at the second port 22-1, ..., 22-N of the combining element 20-1, ..., 20-N, due to the presence of the duplexer 30-1, ..., 30-N. If the connection length L2-1, ..., L2-N from the circulator 20-1, ..., 20-N to the duplexer 30-1, ..., 30-N is very short, the first receive signal 2000-R1, ..., 2000-RN sees the stop band of the duplexer 30-1, ..., 30-N as an open circuit.

The first receive signal 2000-R1, ..., 2000-RN exits the circulator 20-1, ..., 20-N at the first port 21-1, ..., 21-N leading to the passive antenna section 2. The first receive signal 2000-R1, ..., 2000-RN passes through the bandpass filter 10-1, ..., 10-N and propagates down on the transmit-receive path 1000-1, ..., 1000-N of the corporate feed network on to the base transceiver station 11.

Considering now the second receive signal 2002-R1, ..., 2002-RN, the second receive signal 2002-R1, ..., 2002-RN is fed from the antenna arrangement 4-1, ..., 4-N to the port 23-1, ..., 23-N of the circulator 20-1, ..., 20-N. The second receive signal 2002-R1, ..., 2002-RN exits at the second port 22-1, ..., 22-N coupled to the active transceiver arrangement 3-1, ..., 3-N.

The second receive signal 2002-R1, ..., 2002-RN will pass through the receive band portion of the duplexer 30-1, ..., 30-N and on to the active receiver circuits of the active transceiver arrangement 3-1, ..., 3-N.

It should be noted again that the second receive signal 2002-81, ..., 2002-RN can not exit at the first port 21-1, ..., 21-N of the circulator 20-1, ..., 20-N. Indeed, the second receive signal 2002-R1, ..., 2002-RN will see the stop band of the bandpass filter 10-1, ..., 10-N and consequently will not exit at that port. If the connection line L1-1, ..., L1-N is short enough, this path appears as an open circuit for the second receive signal 2002-R1, ..., 2002-RN.

The propagation of the signals has been described with reference to FIG. 1. It should be understood that the same sequence of events takes place in the system of FIG. 2, with the exception that the signals will simply flow directly to the desired port of the summing junction, instead of propagating around the circulator.

Figure 3:
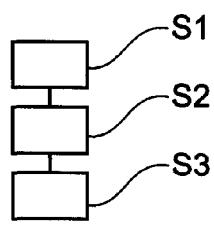
FIG. 3 shows a method for combining transmission signals of different frequency bands in an active antenna transceiver system according to an aspect of the disclosure.

FIG. 3 shows a method for combining transmission signals of different frequency bands in an active antenna transceiver system according to an aspect of the disclosure.

At step S1, the first transmit signal 2000-T1, ..., 2000-TN generated at the passive antenna section 2 is passed into the bandpass filter 10-1, ..., 10-N. The bandpass filter 10-1, ..., 10-N is adapted to pass through telecommunications signals in both the receive frequency band RB1 and the transmit frequency band TB1.

At step S2, the second transmit signal 2002-T1, ..., 2002-TN is generated by the processing arrangement 50-1, ..., 50-N, amplified by the power amplifier 40-1, ..., 40-N and fed onto the duplexer 32-1, ..., 32-N and on to port 22-1, ..., 22-N of the circulator 20-1, ..., 20-N.

At step S3, the first transmit signal 2000-T1, ..., 2000-TN is passed to the first port 21-1, ..., 21-N of the circulator 20-1, ..., 20-N, while the second transmit signal 2002-T1, ..., 2002-TN is fed on to port 22-1, ..., 22-N of the circulator 20-1, ..., 20-N. Both the first transmit signal 2000-T1, ..., 2000-TN and the second transmit signal 2002-T1, ..., 2002-TN exit at port 23-1, ..., 23-N, as a combined telecommunications signal passed to the antenna arrangement 4-1, ..., 4-N.

Figure 4:
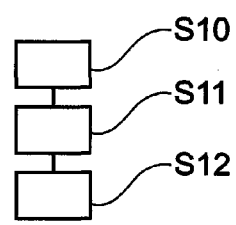
FIG. 4 shows a method for combining receive signals of different frequency bands in an active antenna transceiver system according to an aspect of the disclosure

FIG. 4 shows a method for combining receive signals of different frequency bands in an active antenna transceiver system according to an aspect of the disclosure.

At step S10, the first receive signal 2000-R1, ..., 2000-RN and second receive signal 2002-R1, ..., 2002-RN, are collected by the antenna arrangement 4-1, ..., 4-N and fed to the port 23-1, ..., 23-N of the circulator 20-1, ..., 20-N.

At step S11, the second receive signal 2002-R1, ..., 2002-RN exit at port 22-1, ..., 22-N coupled to the active transceiver arrangement 3-1, ..., 3-N. The second receive signal 2002-R1, ..., 2002-RN is passed to the duplexer 30-1, ..., 30-N onto the active electronics of the active transceiver arrangement 3-1, ..., 3-N.

At step S11, the first receive signal 2000-R1, ..., 2000-RN exits at port 21-1, ..., 21-N coupled to the bandpass filter 10-1, ..., 10-N and onto the passive antenna section 2.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method described herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An active antenna system comprising:
   an antenna element arrangement for transceiving first telecommunication signals in a first frequency band and second telecommunications signals in a second frequency band, the first telecommunications signals being different from the second telecommunications signals and the antenna element arrangement having a plurality of antenna elements;
   a bandpass filter adapted to filter the first telecommunication signals in the first frequency band,
   an active transceiver arrangement adapted to transceive the second telecommunications signals in a second frequency band,
   a combining element adapted for combining the first telecommunications signals and the second telecommunications signals into a combined telecommunications signal to be fed into one of the plurality of antenna elements, wherein
   the one of the antenna elements is adapted to receive the first telecommunications signals in both the first frequency band and second telecommunications signals in the second frequency band; and
   the combining element is further adapted for splitting concurrently a received combined telecommunications signal from the one of the plurality of antenna elements into a receive signal of the first telecommunication signal in the first frequency band and a receive signal of the second telecommunications signals in a second frequency band.

2. The system according to claim 1, wherein the active transceiver arrangement is located adjacent to the at least one antenna element.

3. The system according to claim 1, wherein the first telecommunication signals are collected in a first antenna section coupled to the bandpass filter, the first antenna section comprising a corporate feeder network coupled between the band pass filter and a first transceiver.

4. The system according to claim 1, the combining element comprising at least one of a circulator and a summing junction.

5. The system according to claim 1, wherein a connection length between the bandpass filter and the combining element is chosen such that the bandpass filter appears as an open circuit for the second telecommunications signal.

6. The system according to claim 1, comprising a first shunt resistance connected between the combining element and the band pass filter.

7. The system according to claim 1, wherein a coupling length between the duplexer and the combining element is chosen such that the duplexer appears as a high impedance for the first telecommunications signal.

8. The system according to claim 1, comprising a second shunt resistance connected between the combining element and the duplexer.

9. The system according to claim 1, comprising a coupler adapted to extract a feedback signal from the combined telecommunication signal, the coupler being located between the combining element and said at least one antenna element.

10. The system according to claim 1, the active transceiver arrangement comprising a duplexer adapted to filter the second telecommunications signal, the duplexer being coupled to the combining element.

11. A method for transceiving telecommunication signals in an active antenna arrangement having a plurality of antenna elements, comprising:
  receiving at a bandpass filter a first telecommunications signal in a first frequency band;
  filtering the first telecommunications signal;
  transceiving, by an active transceiver arrangement, a second telecommunications signal in a second frequency band;
  combining, by the combining element, the first telecommunications signal and the second telecommunication signal into a combined telecommunications signal, wherein the first telecommunications signal is different from the second telecommunications signal;
  feeding into one of the plurality of antenna elements located adjacent to the active transceiver arrangement, the combined telecommunications signal to be radiated from the one of the plurality of antenna elements;
  receiving telecommunications signals in both the first frequency band and the second frequency band; and
  splitting concurrently the received telecommunications signal from the one of the plurality of antenna elements into a receive signal of the first telecommunication signal in the first frequency band and a receive signal of the second telecommunications signals in the second frequency band.

12. The method according to claim 11, wherein the first telecommunication signal is collected at a first antenna section coupled to the bandpass filter, the first antenna section comprising a corporate feeder network coupled between the bandpass filter and a first transceiver for processing the first telecommunication signal.

13. The method according to claim 11, wherein the combining the first telecommunications signal and the second telecommunication signal is substantially lossless.

14. The method according to claim 11, comprising extracting, a feedback signal from the combined telecommunication signal.

15. A computer program product comprising a non-transitory computer-usable medium having control logic stored therein for causing a computer to manufacture an active antenna system comprising:
  an antenna element arrangement for transceiving first telecommunications signals in a first frequency band and second telecommunications signals in a second frequency band, the first telecommunications signals being different from the second telecommunications signals and the antenna element arrangement having a plurality of antenna elements;
  a bandpass filter adapted to filter first telecommunication signals in a first frequency band;
  an active transceiver arrangement adapted to transceive second telecommunications signals in a second frequency band; and
  a combining element adapted for combining the first telecommunications signal and the second telecommunication signal into a combined telecommunications signal to be fed into one of the plurality of antenna elements, whereby the combining element is further adapted for
  splitting concurrently a received combined telecommunications signal from the one of the plurality of antenna elements into a receive signal of the first frequency band.

16. A computer program product comprising a non-transitory computer-usable medium having control logic stored therein for causing a transceiver to execute a method for combining telecommunications signals in an active antenna arrangement having a plurality of antenna elements, comprising:
  first computer readable code means receiving at a bandpass filter a first telecommunications signal in a first frequency band;
  second computer readable code means filtering the first telecommunications signal;
  third computer readable code means for transceiving, in active transceiver arrangement, a second telecommunications signal in a second frequency band;
  fourth computer readable code for combining the first telecommunications signal and the second telecommunication signal into a combined telecommunications signal;
  fifth computer readable code means for feeding, into one of the plurality of antenna elements located adjacent to the active transceiver arrangement, the combined telecommunications signal to be radiated from the at least one antenna element;
  sixth computer readable code means for receiving a combined telecommunications signal in both the first frequency band and the second frequency band; and
  sixth computer code means for splitting concurrently the received combined telecommunications signal from the one antenna element into a receive signal of the first telecommunications signal and a receive signal of the second telecommunications signals, wherein the first telecommunications signal is different from the second telecommunications signal.

\* \* \* \* \*

UNITED STATES PATENT AND TRADEMARK OFFICE
CERTIFICATE OF CORRECTION

| | |
|---|---|
| PATENT NO. | : 9,166,664 B2 |
| APPLICATION NO. | : 12/973276 |
| DATED | : October 20, 2015 |
| INVENTOR(S) | : Peter Kenington |

Page 1 of 1

It is certified that error appears in the above-identified patent and that said Letters Patent is hereby corrected as shown below:

In the claims,

Claim 15, Column 14, line 21, "first frequency band." should be -- first frequency band and a receive signal of the second frequency band. --

Claim 16, Column 14, line 49, "one antenna element" should be -- antenna element --

Signed and Sealed this
Twenty-sixth Day of July, 2016

Michelle K. Lee
*Director of the United States Patent and Trademark Office*